(12) United States Patent
Metzger, Jr.

(10) Patent No.: US 8,197,016 B2
(45) Date of Patent: Jun. 12, 2012

(54) BRAKE FILL EFFECT MINIMIZATION FUNCTION

(75) Inventor: Richard P. Metzger, Jr., Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 518 days.

(21) Appl. No.: 12/434,262

(22) Filed: May 1, 2009

(65) Prior Publication Data
US 2010/0276989 A1    Nov. 4, 2010

(51) Int. Cl.
  *B60T 8/60* (2006.01)
  *B60T 13/66* (2006.01)
(52) U.S. Cl. ........ 303/155; 303/166; 303/20; 188/181 C
(58) Field of Classification Search ............ 303/20, 303/154, 155, 160, 166, 167, 168, 112; 188/181 T, 188/181 C, 181 R
See application file for complete search history.

(56) References Cited

U.S. PATENT DOCUMENTS

| | | | |
|---|---|---|---|
| 3,920,204 A | 11/1975 | Bissell et al. | |
| 5,390,990 A * | 2/1995 | Cook et al. | 188/181 T |
| 6,036,285 A * | 3/2000 | Murphy | 303/112 |
| 6,132,016 A * | 10/2000 | Salamat et al. | 303/112 |
| 6,220,676 B1 * | 4/2001 | Rudd, III | 303/112 |
| 6,402,259 B2 | 6/2002 | Corio et al. | |
| 6,722,745 B2 * | 4/2004 | Salamat et al. | 303/112 |
| 7,104,616 B2 | 9/2006 | Zierolf | |
| 7,215,090 B2 * | 5/2007 | Kuramochi et al. | 303/112 |
| 2007/0125607 A1 | 6/2007 | Ralea et al. | |

FOREIGN PATENT DOCUMENTS

DE    198 26 130    12/1999

OTHER PUBLICATIONS

GB; Patents Act 1977: Search Report dated Aug. 27, 2010 in Application No. GB1006746.0.

* cited by examiner

*Primary Examiner* — Thomas J Williams
(74) *Attorney, Agent, or Firm* — Snell & Wilmer L.L.P.

(57) ABSTRACT

A brake fill effect minimization function for preventing or reducing brake controller windup during a brake fill condition or the like that may commonly occur in hydraulic or electromechanical brake systems, particularly during initial application of the brakes or during anti-skid conditions. The function temporarily reduces error input to the brake controller during a perceived brake fill condition (hydraulic brakes) or running clearance condition (electromechanical brakes) thereby facilitating smooth application of the brakes during initial braking and/or under anti-skid conditions.

18 Claims, 4 Drawing Sheets

BRAKE FILL EFFECT MINIMIZATION FUNCTION

FIELD OF THE INVENTION

The present invention relates generally to brake systems for vehicles, and more particularly to brake systems for use in an aircraft.

BACKGROUND OF THE INVENTION

Various types of braking systems are known. For example, hydraulic, pneumatic and electromechanical braking systems have been developed for different applications.

An aircraft presents a unique set of operational and safety issues. For example, uncommanded braking due to failure can be dangerous to an aircraft during takeoff. On the other hand, it is similarly necessary to have virtually fail-proof braking available when needed (e.g., during landing). Moreover, it is important that braking be effected promptly and reliably.

A typical hydraulic brake system, for example, may include the following components among others: a pressure source, a brake actuator for exerting a braking force on a wheel as a result of pressure provided by the pressure source, a valve for controlling an amount of pressure provided from the pressure source to the actuator in response to a command signal, a controller for outputting the command signal in response to system inputs provided to the controller, and a wheel speed sensor. In many such systems, the system inputs include both operator input (e.g., depression of a brake pedal), and measured pressure or force applied to the actuator in response to the operator input.

SUMMARY OF THE INVENTION

When an operator initially requests braking and pressurized fluid is first applied to the actuator, typically there will be some displacement of the brake components prior to force being exerted on the brake material. Consequently, the initial measured pressure or force can be very low for a period of time until braking force is actually applied. Thus, there may be a period of time when the brake command signal does not produce a brake response.

This condition is sometimes referred to as brake fill and, as the controller continues to ask for brake output increases without any measurable result (e.g., braking requested but brake not yet responding with braking action), the brake command signal increases. This can occur, for example, if the controller includes an integrator that accumulates the product of error and time. Therefore, as time passes without error reduction (e.g., no brake response yet) a controller with an integrator or integral action continues to increase its output. Once the brake does finally respond to the command signal (e.g., develops braking torque), the brake responds to the increased command signal. This increased command signal is typically more braking than is desired but is the result of the accumulated error during the brake fill condition. As a consequence of the increased command signal, braking action is finally produced but at an elevated level. The controller then must rid itself of the extra accumulated error before resuming more typical braking levels.

Accordingly, such application of the brakes can result in grabbing or jerky brake performance. This can occur in any type of braking system (e.g., hydraulic, pneumatic, electromechanical, etc.). In an electric brake, for example, the condition can occur as an actuator travels from its retracted position to a position engaging a brake stack.

The invention provides a brake fill effect minimization function for preventing or reducing controller windup during a brake fill condition or the like that may commonly occur in hydraulically actuated brakes as well as electromechanically actuated brakes. The function temporarily reduces error input to a controller during perceived brake fill (or running clearance) conditions thereby facilitating smooth application of the brakes during initial braking and/or under anti-skid conditions.

Accordingly, a system for controlling a braking torque applied to a wheel of a vehicle comprises a power source, at least one brake actuator for exerting a braking force on a wheel as a result of power provided by the power source, a feedback controller having an input for receiving a brake command signal and an output for providing a brake control signal for controlling application of a brake torque to the wheel, and a sensor for measuring an effect resulting from an amount of power supplied to the brake actuator and feeding back a signal to the controller indicative of the supplied pressure. The controller is configured to adjust the brake control signal using the signal fed back from the sensor to limit a degree of feedback control when the difference between a projected power and the supplied power exceeds a first threshold value.

The controller can apply open loop control without the pressure feedback control when the difference between the projected power and the supplied power exceeds a second threshold value greater than the first threshold value.

The controller can scale the error between the projected power and the supplied power when the difference between the projected power and the supplied power is between a first threshold value and a second threshold value, and the scaled error can be used for feedback control. The power source can be a hydraulic power source, and the brake output command can be operative to control a pressure control valve to supply a desired pressure to a hydraulic brake actuator. Alternatively, the power source can be an electric power source, and the brake output command can be operative to supply a current to an electromechanical brake actuator.

In accordance with another aspect, a method for controlling a braking torque applied to a wheel of a vehicle by a braking system, said braking system including a power source and at least one brake actuator for exerting a braking force on a wheel as a result of power provided by the power source, the method comprises the steps of receiving a brake command signal indicative of a desired amount of braking to be applied to the wheel, and providing a brake output control signal to control an amount of power supplied to a brake actuator assembly by the power supply, measuring an effect of an amount of power supplied to the actuator assembly and performing feedback control of the brake pressure output signal using a signal indicative of the amount of supplied power, adjusting the brake output control signal using the feedback control based on the amount of supplied power, and limiting a degree of feedback control when the difference between a projected power and the supplied power exceeds a first threshold value.

The method can further comprise applying open loop control without the feedback control when the difference between a projected power and the supplied power exceeds a second threshold value greater than the first threshold value. In addition, the method can include scaling the error between the projected power and the supplied power when the difference between the projected power and the supplied power is between a first threshold value and a second threshold value, and using the scaled error to perform feedback control of the output control signal.

In accordance with another aspect, a device for providing a brake fill minimization function for a brake system that controls brakes based on a feedback control parameter related to measured power supplied to a brake actuator, said device being configured to receive a signal indicative of a desired amount of braking to be applied, generate a brake output control signal for controlling an amount of power to be supplied to the actuator to effect braking, receive a signal indicative of an effect of the amount of supplied power, compare the supplied power to a projected power, and limit a degree of feedback control when the difference between the projected power and the supplied power exceeds a first threshold value.

The device can be configured to apply open loop control without pressure feedback control when the difference between the projected power and the supplied power exceeds a second threshold value greater than the first threshold value, and/or further configured to scale the error between the projected power and the supplied power when the difference between the projected power and the supplied power is between a first threshold value and a second threshold value, and wherein the scaled error is used by the controller for feedback control. The device can be incorporated into a brake system control unit (BSCU) of a brake system.

Further features of the invention will become apparent from the following detailed description when considered in conjunction with the drawings.

DETAILED DESCRIPTION

Figure 1:
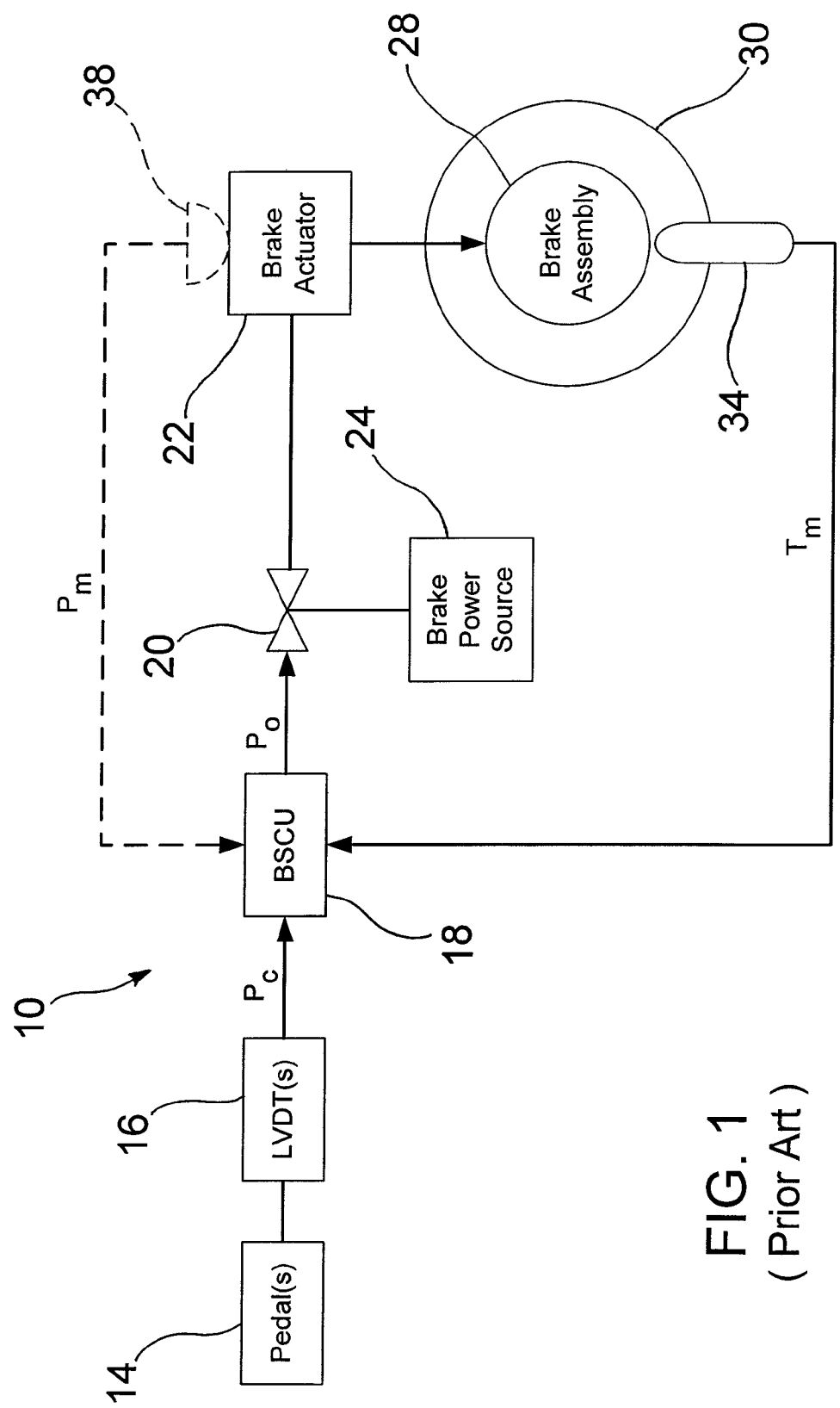
FIG. 1 is a schematic diagram of a hydraulic brake system.

The present invention will now be described with reference to the drawings, wherein like reference numerals are used to refer to like elements throughout.

Referring initially to FIG. 1, a conventional hydraulic brake control system as used in an aircraft is generally designated 10. Generally speaking, brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair, there is a right wheel control and left wheel control.

The left and right wheel control functions are uncoupled except possibly for locked wheel protection. The basic unit therefore consists of a control for a single wheel that can be left or right. As utilized herein, it will be appreciated that the term "wheel" is intended to refer collectively to both the wheel and tire.

For sake of simplicity, the brake control system 10 (also referred to herein as system 10) as shown in FIG. 1 represents the basic unit for providing brake control of a single wheel (e.g., left or right). However, it will be appreciated that control for the other wheel(s) can be provided via a corresponding system(s) 10 or in a single system incorporating the same inventive principles. Moreover, the present invention as described provides brake control in connection with an aircraft. Nevertheless, it will be appreciated that the brake control system 10 including a brake fill effect minimization function according to the present invention has utility for virtually any type of vehicle and is not limited necessarily to brake control for aircraft. Further, the brake control system according to the present invention could also be used in a test environment with brake dynamometers, for example.

The system 10 includes a pilot input device in the form of pedal 14 and an LVDT 16 for measuring brake pedal displacement and sending a pilot commanded signal $P_c$ to a brake system control unit BSCU 18. Specifically, the BSCU 18 interprets the pedal displacement as a command for appropriate control mode and sends a brake pressure output command signal $P_O$ in the form of a valve current to a brake pressure control valve 20 that is configured to modulate pressure supplied to a brake actuator 22 from a brake power source 24. The brake assembly 28 in turn provides braking action to wheel 30 by exerting a braking torque or force on the wheel 30 as is conventional. The wheel 30 is coupled to the aircraft (or other vehicle) via a conventional structure (not shown).

The system 10 can further include a wheel speed sensor and/or brake torque sensor 34 that measures the wheel speed and/or the amount of torque exerted by the brake actuator 22 and brake assembly 28 on the wheel 30. The wheel speed and/or brake torque sensor 34 can be any suitable type of sensor that provides an output signal (e.g., measured torque signal $T_m$) indicative of the braking torque and/or speed of the wheel 30. The measured torque signal $T_m$, for example, can be supplied to the controller 18 for use as an input to the brake controller 18 in some applications.

The system 10 further includes pressure sensor 38 that measures the pressure applied to the brake actuator 22. The pressure sensor 38 may be any conventional pressure sensor. The output of the pressure sensor 38, measured pressure signal $P_m$, represents the pressure supplied to the brake actuator 22. The measured pressure signal $P_m$ is fed back to the BSCU 18 and is used as an input to the brake controller 18 representative of the applied pressure. In an electromechanical brake system, a load cell present within the actuator or the observer output within the actuator control (estimating force from actuator current and position) would provide a measurement of actuator force that could be used, as will be appreciated, in place of the $P_m$ signal in the brake fill effect minimization function as described below.

Generally describing the operation of the system 10, during a braking event the pilot of the aircraft activates the brakes by depressing the pedal 14 (or its equivalent). The depression of the pedal 14 is converted to an electrical signal (command pressure signal $P_c$) by LVDT 16 that is provided to the BSCU 18. The value of the command pressure signal $P_c$ is indicative of the degree of depression of the pedal, and is related to the amount of braking commanded by the pilot. The BSCU 18 uses the command pressure signal $P_c$ to derive a suitable brake pressure output command signal $P_o$. It will be appreciated that the brake pressure output command signal $P_o$ may be a valve current for a hydraulic brake or a force signal in the case of an electromechanical brake, for example.

The brake pressure output command signal $P_o$ (e.g., valve current) is input to the pressure control valve 20 which then applies a desired pressure to the actuator 22. The brake actuator 22 in turn applies pressure to the brake assembly 28 based on the brake pressure output from the control valve 20 in a conventional manner. The applied brake pressure creates a torque which results in a reduction in the rotational speed of the wheel 30 which is measured by the wheel speed/brake torque sensor 34 and fed back to the BSCU 18. Utilizing the measured pressure signal $P_m$ and comparing it to the pilot commanded pressure $P_c$ and/or measured torque $T_m$, the BSCU 18 computes a projected pressure to apply an appropriate amount of braking force to the wheel.

For example, as will be described more fully below in connection with FIG. 2, if the measured pressure signal $P_m$ is greater than the command signal $P_c$, the BSCU 18 reduces the value of the brake pressure output command signal $P_o$ fed to control valve 20 to reduce braking. In the event the measured pressure signal $P_m$ is less than the command pressure signal $P_c$, the BSCU 18 will increase the value of the brake pressure output command signal $P_o$ fed to control valve 20 to increase braking.

As will be appreciated, in a hydraulically actuated system such as described, the time to fill the hydraulic cavity of the actuator can have negative impacts on overall system performance, particularly during low commanded pressure (e.g., initial braking application) and low runway coefficient of friction (e.g., anti-skid) conditions such as commonly occur on an icy runway. A similar effect can occur with both electromechanical and pneumatic actuators upon initial brake application during clearance take-up as well on icy runways, for example.

For example, during initial braking application as the pilot commanded pressure $P_c$ increases beyond contact pressure, the brake-fill effect causes the difference between the commanded pressure $P_c$ and the measured pressure $P_m$ to increase. Thus, the brake-fill condition increases the time before the measured brake pressure $P_m$ begins responding to the pilot's commanded pressure $P_c$. As a result, a conventional BSCU would begin ramping the output pressure signal $P_o$ upward to minimize the error between the measured and commanded pressures $P_m$ and $P_c$. In control terminology, the brake-fill phenomena represents a source of brake controller wind-up. When the brake fill condition terminates, the measured pressure signal $P_m$ begins responding to the previously increasing control signal $P_o$. As a consequence, the measured brake pressure $P_m$ increases in an undesired manner which can often be observed as grabbing or jerky brake performance.

Figure 2:
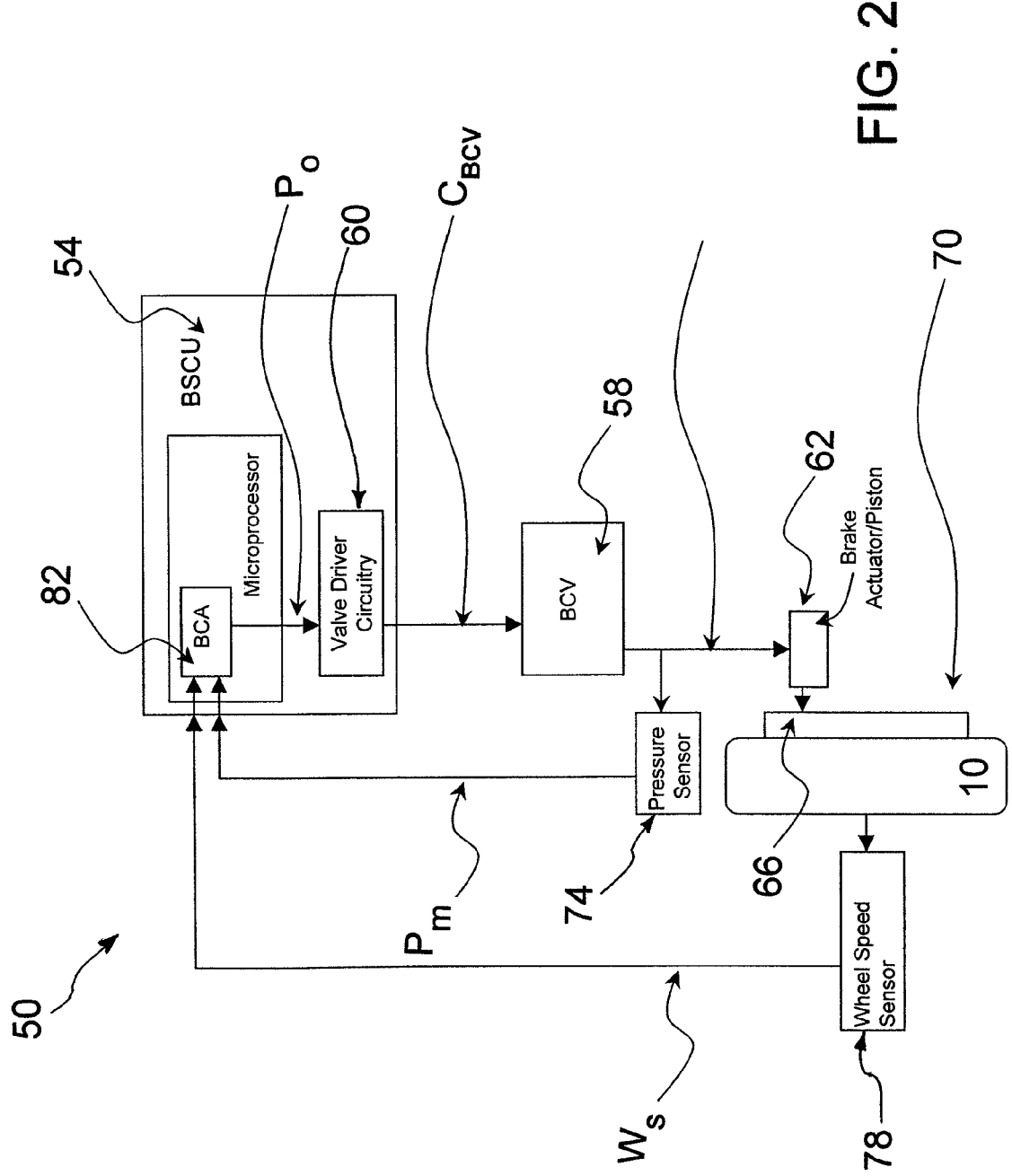
FIG. 2 is a schematic diagram of an exemplary hydraulic brake system including a brake fill effect minimization function in accordance with the invention.

Turning to FIG. 2, a brake system 50 including a brake-fill effect minimization function in accordance with the invention is illustrated. The system 50 generally includes the same components as the system 10 of FIG. 1 including a BSCU 54 for receiving a brake command from a pilot via an LVDT or the like (not shown in FIG. 2). The BSCU 54 generates a brake control output $P_o$ that drives valve drive circuitry 60. A brake control valve 58 receives a brake valve current $C_{bcv}$ from valve drive circuitry 60 and, in response thereto, supplies hydraulic fluid to a brake actuator 62 configured to apply force to a brake stack 66 for braking a wheel 70. A pressure sensor 74 senses the pressure supplied to the actuator 62 and feeds a corresponding signal back to the BSCU 54. A wheel speed sensor 78 senses wheel speed and feeds a corresponding signal $W_s$ back to the BSCU 54 as well.

A microprocessor of the BSCU 54 in this embodiment executes a brake control algorithm BCA 82 including the brake fill minimization function in accordance with the invention. The microprocessor accesses external signals using the BSCU 54 electrical circuitry as will be described. The primary BCA signals include pedal deflection, wheel speed as sensed by the wheel speed sensor 78, brake line pressure as sensed by the pressure sensor 74, brake output command signal $P_o$ and brake control valve current $C_{bcv}$.

During operation, pedal deflection is interpreted by the BCA 82 as setting a desired amount of pressure (known as a reference command). The BCA 82 computes output commands $P_o$ used to create brake control valve currents $C_{bcv}$ which result in brake pressure and brake torque to achieve wheel deceleration targets.

When this projected pressure $P_{prj}$ differs from the measured pressure $P_m$ by a key threshold, then the BCA 82 error signal (e.g., reference speed minus measured speed) is scaled. This scaled error reduces the integrator windup so that when the actuator 62 contacts the brake stack 66 the controller output command hasn't increased dramatically. Accordingly, the time to achieve nominal controller operation under such conditions is improved.

The error scaling generally occurs only when the measured pressure $P_m$ is between minimum and maximum pressure thresholds. The minimum threshold exists so that actuator 62 can initialize motion leading to the actuator 62 contact with the brake stack 66. The maximum threshold exists to focus the minimization function activity to the brake fill delay (and not actuator response lag, for example).

Accordingly, the brake fill minimization function generally operates by identifying the occurrence of a brake fill condition by comparing the projected pressure to the measured pressure, and responding to such condition by scaling the error between the brake command pressure and the measured pressure.

Figure 3:
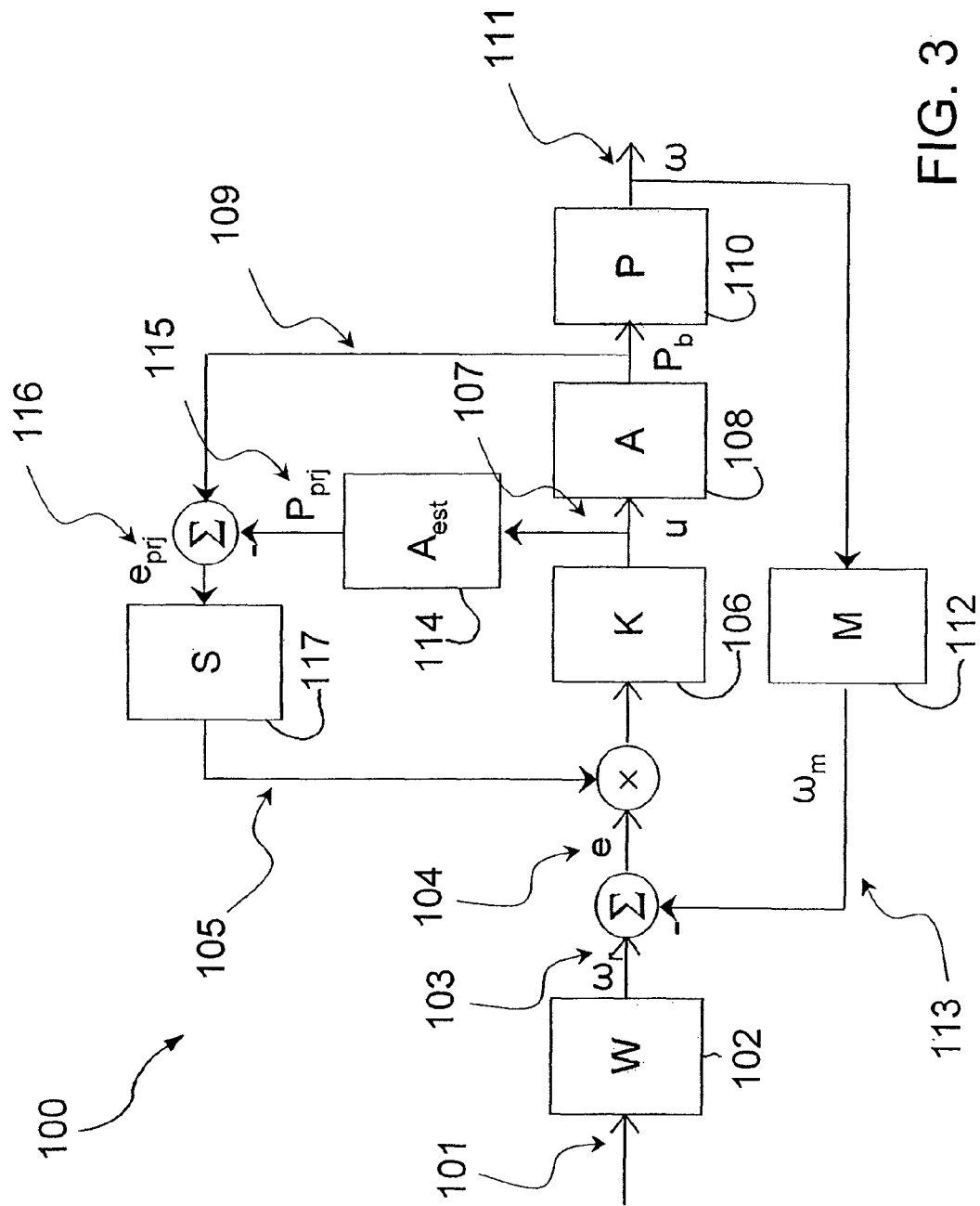
FIG. 3 is an control block diagram illustrating the brake fill effect minimization function.

With reference to FIG. 3, a feedback block diagram of the function is indicated generally by reference numeral 100. This diagram shows a simple feedback block diagram of a single wheel brake control system 102, 106, 108, 110 and 112 with the brake fill minimization function 114 and 117. The single wheel brake control system functions generally as follows.

Pedal deflection is interpreted as desired wheel speed reference signal 101 by the BCA. This wheel speed reference is processed by the system W 102 to produce the reference speed 103 used by the antiskid/decel control system. This reference speed is compared with the filtered measured wheel signal 113. The difference between the reference and measured wheel speed forms the error signal 104.

This error signal 104 is the signal which the brake fill minimization function may reduce or scale before passing the signal onto the controller 106. The controller computes a brake command signal (u; 107) which is used to create a valve current for the actuation system 108. The actuation subsystem includes BSCU circuitry, hydraulic valves, hydraulic lines, and the brake line pressure sensor. The actuation system output and input to the plant system (P; 110) is brake pressure 109. The plant system includes the brake, wheel, tire, tire/runway interface. Within the plant system the pressure input is converted to brake torque which decelerates the wheel and aircraft. The wheel speed 111 is measured and processed by the sensor subsystem (M; 112). This is the same signal used to compute the error signal for the controller and forms the feedback loop used to implement antiskid/decel control.

The brake fill minimization function monitors brake pressure performance and scales the control input error when brake performance is not desirable. The minimization function uses the measured brake pressure 109 and a projected brake pressure to determine brake performance. The projected brake pressure 115 uses the brake command signal 107 from the controller to compute the expected brake pressure.

This computation can be based on input-output performance data for the actuation system (e.g., open loop current to pressure relationship for the BCV 58). The difference 116 between the measured and projected pressure is input to the scaling system 117. The scaling subsystem uses the absolute value of the projected error 116 to compute the amount of scaling 105 to apply to the controller input error. When brake performance is good (e.g., small projected error) there is small scaling applied to the error signal. When brake performance is bad (e.g., brake fill effect creates a larger projected error) then more scaling is applied to the controller error.

Figure 4:
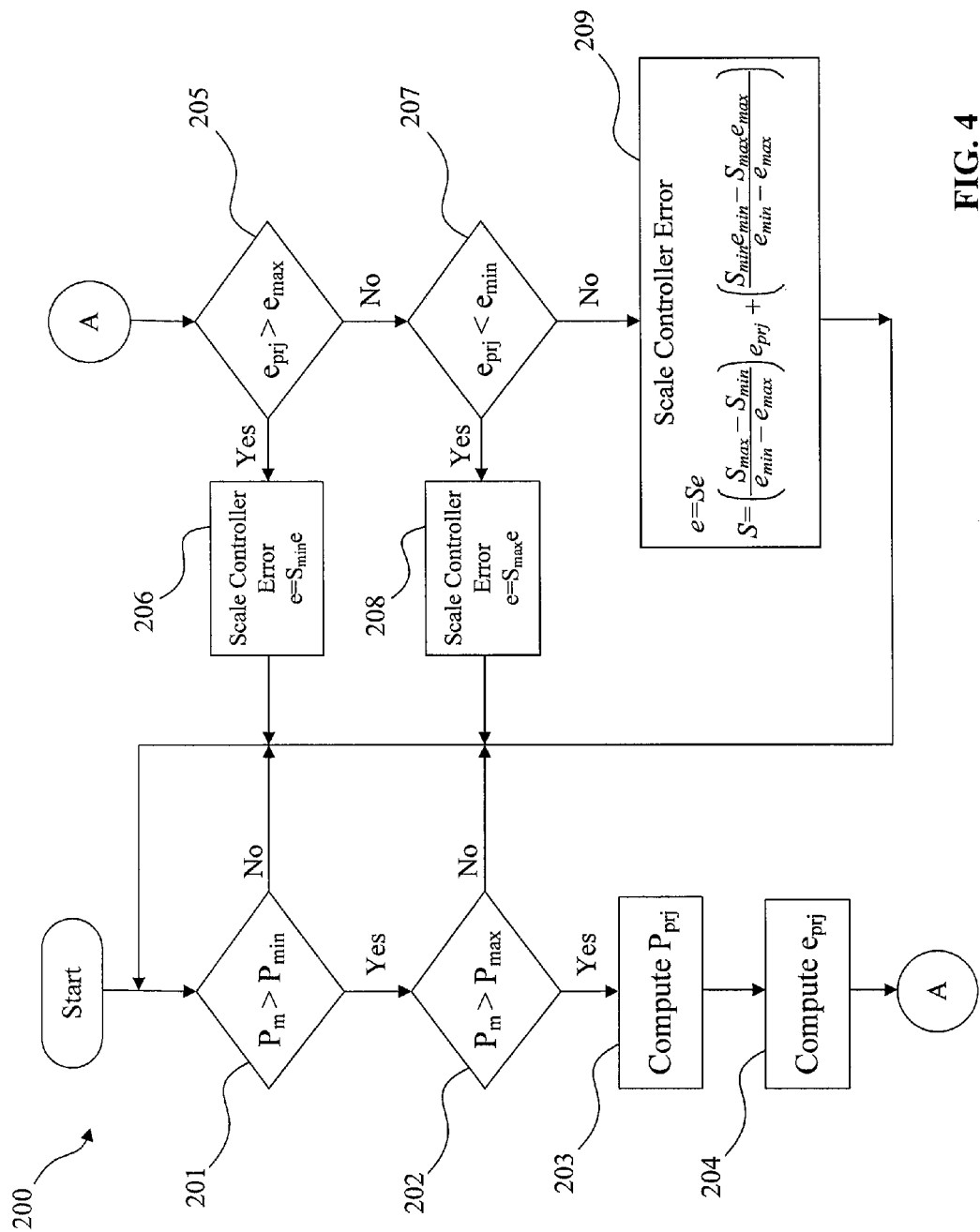
FIG. 4 is a flow chart illustrating the brake fill effect minimization function.

Turning to FIG. 4, a flow diagram for the brake fill effect minimization function is illustrated and indicated generally by reference numeral 200. As will be appreciated, this function 200 includes several functions (projected pressure, scaling function) and tuning parameters (Pmin, Pmax, Smin, Smax, emin, emax). These functions and parameters depend on the particular dynamic properties of the brake and aircraft being considered. Each sample or calculated controller update considers the above flow diagram.

The process starts at process step 201 with the comparison of the measured brake pressure $P_m$ against a minimum brake pressure, $P_{min}$. This minimum brake pressure exists to ensure that sufficient brake pressure is applied to initiate the process of brake fill (or running clearance closure for an electric brake). Without this condition, the function 200 could keep the brake fixed at zero pressure and no braking would occur. No other function processing occurs if the measured brake pressure fails this condition.

If $P_m$ is greater than $P_{min}$, then in process step 202 the measured brake pressure $P_m$ is compared with a maximum brake pressure, $P_{max}$. This pressure exists to prevent the minimization function from being applied to a condition unlikely to be brake fill. Since brake fill phenomenon is isolated to a low pressure range, this maximum pressure bounds the pressure (or electric actuator position for an electric brake) over which the phenomenon is expected to occur.

If the measured brake pressure $P_m$ is within the appropriate range defined by the previous two conditionals, then the projected pressure $P_{prj}$ and projected error $e_{prj}$ are calculated in process steps 203 and 204, respectively. The projected brake pressure $P_{prj}$ is computed using the dynamic relationship between the brake command variable, BCA output variable, and brake pressure. This provides an estimation (without the influence of brake fill) of the brake pressure performance. Therefore, when compared to the measured pressure $P_m$, any significantly large difference is likely the result of brake fill. Brake fill differences can occur during the initial application of pressure or when pressure oscillates (e.g., due to antiskid pressure cycling) near contact pressure. Therefore, the difference between projected $P_{prj}$ and measured pressures $P_m$ can be positive or negative while experiencing the effects of brake fill.

The detection of brake fill phenomena generally relies more upon the magnitude of the error than the sign of the error. As a result, the brake fill minimization function 200 considers the absolute value of the difference between the projected $P_{pr}$, and measured pressures $P_m$.

In process step 205, the magnitude of the projected error $e_{prj}$ is compared against the maximum error bound, $e_{max}$. This error bound represents a minimum error level caused by the brake fill effect. Therefore, if the error exceeds this boundary then there is a strong indication the brake is experiencing brake fill. When the projected error $e_{prj}$ exceeds this bound the controller input error is scaled by the maximum amount in process step 206 (specified by $S_{min}$). This provides the controller a reduced error and slows integral term output signal growth during periods of brake fill.

If the error $e_{prj}$ does not exceed $e_{max}$ in process step 205, then the magnitude of the projected error $e_{prj}$ is compared in process step 207 against the minimum error bound, $e_{min}$. This error bound represents the condition without any error caused by the brake fill effect. Therefore, minimal scaling of the controller input error is required. When the projected error $e_{prj}$ is less than this bound, the controller input error is scaled by the minimum amount in process step 208 (specified by $S_{min}$ and generally equal to one). This provides the controller an essentially unaltered error.

If the projected error $e_{prj}$ is between the minimum and maximum error bounds, then the scaling is determined by a linear function, for example, in process step 209. The output of this linear function is bounded by the scaling of the previous to conditions and is specified by the following equation:

$$S = \left(\frac{S_{max} - S_{min}}{e_{min} - e_{max}}\right)e_{prj} + \left(\frac{S_{min}e_{min} - S_{max}e_{max}}{e_{min} - e_{max}}\right)$$

As will be appreciated, the scaling could be performed in accordance with a wide range of functions of various orders, as desired.

As will further be appreciated, the brake system described above may operate in two modes: antiskid/Decel Control Mode and Pressure Control Mode. In Antiskid/Decel Control Mode, pedal deflection is interpreted as setting a deceleration target. The antiskid/deceleration controller computes output commands to achieve wheel speed/deceleration targets (without explicit concern for pressure). The brake minimization function uses open loop relationships between the antiskid/deceleration controller's output command and pressure to compute a projected pressure. When the projected pressure differs from the measured pressure by a key amount of pressure then the antiskid/decel controller error signal is scaled. The scaled error reduces the integrator windup so that when the actuator does contact the brake stack the controller output command hasn't increased as much.

In Pressure Control Mode operation the pedal deflection is interpreted as setting a brake pressure target. This brake pressure target is the projected pressure target during this control mode. When the projected pressure differs from the measured pressure by a key amount the pressure controller error signal is scaled.

Although described chiefly in the context of a hydraulic brake, it will be appreciated that aspects of the invention can be applied to electric brakes as well. As noted, in an electric brake a brake fill-like condition can occur when a brake actuator is running clearance prior to engaging a brake stack. This clearance take-up produces essentially the same effect as a brake fill condition in a hydraulic brake and can be minimized as described above by sensing the condition and scaling the input error.

As used in this description, the terms power and/or power source includes hydraulic power sources and power, electric power sources and power, and/or pneumatic power sources and power. In the context of a hydraulic or pneumatic system, an effect resulting from power supplied to an actuator includes hydraulic or pneumatic pressure. In the context of an electric system, an effect of power supplied to an actuator includes electric current Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for controlling a braking torque applied to a wheel of a vehicle comprising:
   a power source;
   at least one brake actuator for exerting a braking force on a wheel as a result of power provided by the power source;
   a feedback controller having an input for receiving a brake command signal, and an output for providing a brake control signal for controlling application of a brake torque to the wheel; and
   a sensor for measuring an effect resulting from an amount of power supplied to the brake actuator and feeding back a signal to the controller indicative of the supplied power;
   wherein the controller adjusts the brake control signal using the signal fed back from the sensor to limit a degree of feedback control in response to the difference between a projected power and the supplied power exceeds a first threshold value;
   wherein the controller applies open loop control without the pressure feedback control in response to the difference between the projected power and the supplied power exceeds a second threshold value greater than the first threshold value.

2. A system as set forth in claim 1, wherein the controller scales an error between the projected power and the supplied power in response to the difference between the projected power and the supplied power is between a first threshold value and a second threshold value, and wherein the scaled error is used for feedback control.

3. A system as set forth in claim 1, wherein the error is scaled linearly.

4. A system as set forth in claim 1, wherein the power source is a hydraulic power source, and the brake output command is operative to control a pressure control valve to supply a desired pressure to a hydraulic brake actuator.

5. A system as set forth in claim 4, wherein the sensor includes a pressure sensor for measuring hydraulic pressure supplied to the hydraulic brake actuator.

6. A system as set forth in claim 1, wherein the power source is an electric power source, and the brake output command is operative to supply a current to an electromechanical brake actuator.

7. A system as set forth in claim 1, wherein the vehicle is an aircraft.

8. A method for controlling a braking torque applied to a wheel of a vehicle by a braking system, said braking system including a power source and at least one brake actuator for exerting a braking force on a wheel as a result of power provided by the power source, the method comprising the steps of:
   receiving a brake command signal indicative of a desired amount of braking to be applied to the wheel, and providing a brake output control signal to control an amount of power supplied to a brake actuator assembly by the power supply;
   generating a signal indicative of a supplied power by measuring an effect resulting from an amount of power supplied to the actuator;
   performing feedback control of the brake pressure output signal using the generated signal; and
   limiting a degree of feedback control in response to the difference between a projected power and the supplied power exceeds a first threshold value;
   further comprising applying open loop control without the feedback control in response to the difference between a projected power and the supplied power exceeds a second threshold value greater than the first threshold value.

9. A method as set forth in claim 8, further comprising scaling an error between the projected power and the supplied power in response to the difference between the projected power and the supplied power is between a first threshold value and a second threshold value, and using the scaled error to perform feedback control of the output control signal.

10. A method as set forth in claim 9, further comprising scaling the error linearly.

11. A method as set forth in claim 8, wherein the power source includes a hydraulic power source, and the brake output command is operative to control a pressure control valve to supply a desired pressure to a hydraulic brake actuator.

12. A method as set forth in claim 11, wherein the generating a signal indicative of a supplied power by measuring an effect resulting from an amount of power supplied to the actuator includes measuring pressure supplied to the actuator.

13. A method as set forth in claim 8, wherein the power source includes an electric power source, and the brake output command is operative to supply a current to an electromechanical brake actuator.

14. A device for providing a brake fill minimization function for a brake system that controls brakes based on a feedback control parameter related to measured power supplied to a brake actuator, said device configured to:
   receive a signal indicative of a desired amount of braking to be applied;
   generate a brake output control signal for controlling an amount of power to be supplied to the actuator to effect braking;
   receive a signal indicative of an effect of an amount of supplied power;
   compare the amount of supplied power to a projected power; and
   limit a degree of feedback control in response to the difference between the projected power and the supplied power exceeds a first threshold value;
   wherein the device is configured to apply open loop control without pressure feedback control in response to the difference between the projected power and the supplied power exceeds a second threshold value greater than the first threshold value.

15. A device as set forth in claim 14, wherein the device is further configured to scale an error between the projected power and the supplied power in response to the difference between the projected power and the supplied power is between a first threshold value and a second threshold value, and wherein the scaled error is used by the controller for feedback control.

16. A device as set forth in claim 15, wherein the device is further configured to scale the error linearly.

17. A device as set forth in claim 14, wherein the device is incorporated into a brake system control unit (BSCU).

18. A brake system for controlling braking operations of a vehicle, comprising:
   the device according to claim 14; and
   a brake system control unit (BSCU) operatively coupled to the device.

* * * * *